J. COOPER.
Cow-Milker.

No. 213,628. Patented Mar. 25, 1879.

Witnesses
A. B. Williams,
Francis C. Bowen.

Inventor
John Cooper.

UNITED STATES PATENT OFFICE.

JOHN COOPER, OF NEW YORK, N. Y.

IMPROVEMENT IN COW-MILKERS.

Specification forming part of Letters Patent No. 213,628, dated March 25, 1879; application filed January 11, 1879.

*To all whom it may concern:*

Be it known that I, JOHN COOPER, of New York city, in the county of New York and State of New York, have invented certain new and useful Improvements in Cow-Milkers; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to that class of cow-milkers in which is employed a group or series of tubes, the ends of which are inserted in the teat. As heretofore constructed these ends produce irritation or inflammation of the parts to which they are applied, and, moreover, no provision is made for preventing the upward passage of air through the tubes.

The object of my invention is to prevent inflammation or injury to the parts, either by the insertion of the ends of the tubes, or by the passage of air upward through the tubes; and to this end the invention consists in an improved construction of the tips of the tubes, whereby they may be inserted and withdrawn from the teats without discomfort or injury thereto; and, further, in connecting the tubes by means of an air-trap inclosing their lower ends, whereby provision is made for preventing the upward passage of air through them, and consequent injury to the udder.

The accompanying drawings illustrate a mode of carrying out my invention.

Figure 1:
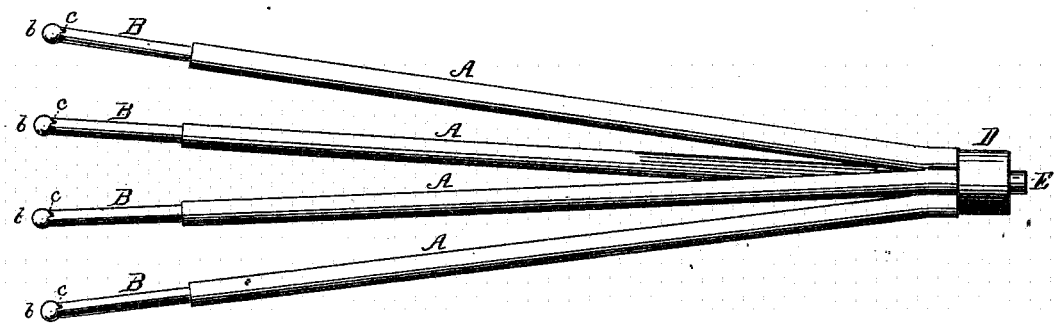
Figure 2:
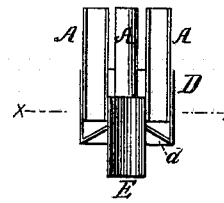
Figure 3:
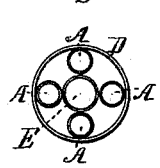

Figure 1 is a perspective view of a cow-milker embodying my improvements. Fig. 2 is a longitudinal sectional view. Fig. 3 is a transverse sectional view.

The tubes A are made of rubber or other suitable flexible material. Each tube has its upper end provided with a hollow tip, B, of metal or other suitable substance, for insertion into the teat. The extreme end of the tip B is surmounted by a globe or ball, $b$, and under the lower hemisphere of this globe or ball are perforations $c$, to allow the milk to flow into the tubes. By this construction a tip is produced which is without angles or cross-sections, and which is inserted in and withdrawn from the teat without injury thereto or discomfort to the cow.

The lower ends of the tubes A are inclosed in a cup, D, in the center of which is a short pipe or tube, E.

The cup D is preferably of cylindrical form, with its ends closed, its bottom $d$ being convex on the inner surface, so as to form an annular trough or gutter around the circumference.

The lower ends of the tubes A terminate before reaching the bottom $d$. The upper end of the short pipe or tube E terminates below the top of the cup D, and its lower end extends out through the bottom $d$. The pipe E thus constitutes an overflow-pipe, and acts as an air stop or trap to prevent the passage of air into the tubes.

The milk from the teats flows down through the tubes A to the bottom of the cup D, where it rises until it overflows the pipe E, through which it passes to the pail or other receptacle.

The cup D may be made with either its sides or one of the ends removable, so as to provide for cleaning when desired.

By providing the tubes with an air stop or trap the upward passage of air is prevented, so that when one teat ceases to give milk there is no danger of air passing upward through the tube, and consequently no danger of bloating, inflammation, and caking of the udder, which would result from the admission of air through the tubes, and would cause pain and injury to the animal.

Having thus fully described my invention, what I claim, and desire to secure by Letters Patent, is—

1. A cow-milker tube having its tips terminating in a bulb, $b$, having orifices in its lower part, $c$, substantially as described, and for the purpose set forth.

2. The combination of a series of flexible and rigid tubes, A B, of a cow-milker, arranged in a cup, D, to extend below the upper end of tube E, the opposite end of which projects from said cup to connect with a reservoir, substantially as described.

In testimony that I claim the foregoing I have hereunto set my hand.

JOHN COOPER.

Witnesses:
  BENJ. A. WHITEMAN,
  FRANCIS C. BOWEN.